C. B. TURNBULL.
Street-Car Awnings.

No. 140,972.

Patented July 15, 1873.

WITNESSES.
O. D. Newman,
Wm. H. Brereton Jr.

INVENTOR
Claudia B. Turnbull
By Leggett & Leggett,
Attorneys.

UNITED STATES PATENT OFFICE.

CLAUDIA B. TURNBULL, OF WASHINGTON, DISTRICT OF COLUMBIA.

IMPROVEMENT IN STREET-CAR AWNINGS.

Specification forming part of Letters Patent No. 140,972, dated July 15, 1873; application filed June 13, 1873.

*To all whom it may concern:*

Be it known that I, CLAUDIA B. TURNBULL, of Washington, in the county of Washington and District of Columbia, have invented certain new and useful Improvements in Awnings for Street-Railroad Cars; and I do hereby declare the following to be a full, clear, and exact description of the invention, such as will enable others skilled in the art to which it pertains to make and use it, reference being had to the accompanying drawings, which form part of this specification.

Figure 1:
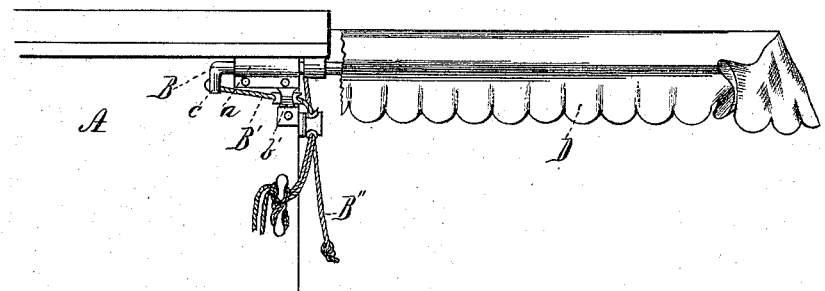
Figure 2:
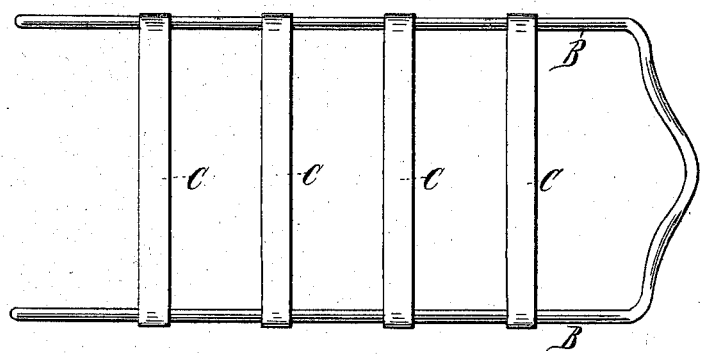
Figure 3:
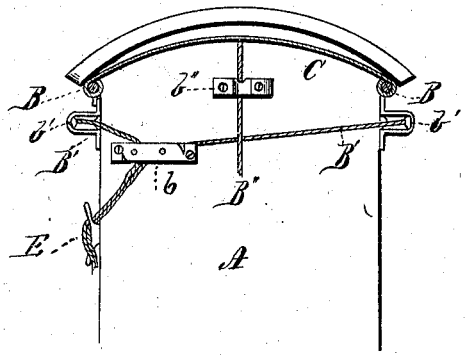

My invention relates to an improvement in awnings for street-railroad cars; and consists as follows:

In the drawings, Figure 1 is a side view of a car with the awning attached; Fig. 2, a plan view of the frame-work of the awning; Fig. 3, an end or front view of the car.

A represents the ordinary street-railroad car. Sliding within suitable guides $a$, at the top and on both sides of the car, are stout rods B, each bent in a curved or other form at its outer end. This rod may be in one piece, bent in the form shown. Attached to, but sliding loosely on, these rods B are rib pieces C. D represents a canvas or other suitable covering, which is attached to the rods B and ribs C. To the ends $c$ of each of these rods B are attached cords B', passing through suitable guide-pulleys $b'$. At the front end of this frame-work B C is attached another cord, B'', which passes through the guide-pulley $b''$. Hooks are attached at suitable positions on the car, on which to wind and hold the different cords.

When it is desired to use the awning to protect the horses, driver, &c., of a street-railroad car, the cords B' are pulled, sliding out the frame-work B C with its covering D, said frame-work being of a length sufficient to extend over the horses, completely shading and protecting them from the weather.

The awning is closed by pulling the center cord B'', drawing up the awning and frame-work in a compact form beneath the projecting portion of the roof of the car.

I know that awnings have been made to slide forward and backward, as contemplated by me; but my device relates to such an awning in connection with a certain arrangement of cords and pulleys, by which the awning may be readily operated in either direction by the driver without changing his position; and in connection, also, with means by which the awning may be secured in any position desired.

Having thus described my invention, what I claim as new, and desire to secure by Letters Patent, is—

In combination with the sliding street-car awning, the cords B' and B'', one attached to lugs C at the extremity of the frame B and the other attached to the front of the awning-frame, the intermediate pulleys $b$ $b'$ $b''$, and cleat E, by means of which the driver, from his position on the front platform, may throw the awning forward, draw it back, or secure it in any desired position, substantially as set forth and shown.

In testimony that I claim the foregoing I have hereunto set my hand this 13th day of June, 1873.

CLAUDIA B. TURNBULL.

Witnesses:
    EDM. F. BROWN,
    WELLS W. LEGGETT.